United States Patent
Wakefield et al.

(10) Patent No.: US 11,443,087 B2
(45) Date of Patent: Sep. 13, 2022

(54) SYSTEM AND METHOD FOR POWER ANALYSIS FOR DESIGN LOGIC CIRCUIT WITH IRREGULAR CLOCK

(71) Applicant: Synopsys, Inc., Mountain View, CA (US)

(72) Inventors: Alexander John Wakefield, Fort Lauderdale, FL (US); Jitendra Gupta, Mountain View, CA (US); Vaibhav Jain, Cupertino, CA (US); Rahul Jain, Mountain View, CA (US); Shweta Bansal, Noida (IN)

(73) Assignee: SYNOPSYS, INC., Mountain View, CA (US)

( * ) Notice: Subject to any disclaimer, the term of this patent is extended or adjusted under 35 U.S.C. 154(b) by 69 days.

(21) Appl. No.: 16/875,777

(22) Filed: May 15, 2020

(65) Prior Publication Data

US 2020/0364391 A1 Nov. 19, 2020

(30) Foreign Application Priority Data

May 19, 2019 (IN) .............................. 201911019698

(51) Int. Cl.
G06F 30/396 (2020.01)
G06F 30/3308 (2020.01)
G06F 119/06 (2020.01)

(52) U.S. Cl.
CPC ...... *G06F 30/3308* (2020.01); *G06F 2119/06* (2020.01)

(58) Field of Classification Search
CPC . G06F 30/3308; G06F 2119/06; G06F 30/396
See application file for complete search history.

(56) References Cited

U.S. PATENT DOCUMENTS

| | | | | |
|---|---|---|---|---|
| 2008/0125985 A1* | 5/2008 | Chaudhry | ............. | G06F 30/367 702/61 |
| 2009/0271167 A1* | 10/2009 | Zhu | ........................ | G06F 30/331 703/14 |
| 2017/0310315 A1* | 10/2017 | Ramakrishnan | ......... | H03K 5/26 |

OTHER PUBLICATIONS

Ray Turner, Learn how processor-based emulation works, Cadence, Oct. 27, 2005 (Year: 2005).*

* cited by examiner

*Primary Examiner* — Nghia M Doan
(74) *Attorney, Agent, or Firm* — Sterne, Kessler, Goldstein & Fox P.L.L.C.

(57) ABSTRACT

A system is disclosed that includes a memory and a processor configured to perform operations stored in the memory. The processor performs the operations to select a master clock for a plurality of clocks in a design logic circuit. The processor further performs the operations to align a clock edge of a clock of the plurality of clocks with a corresponding nearest clock transition of the master clock. The aligned clock edge of the clock limits a number of emulation cycles for the design logic to a fixed number of emulation cycles required for the master clock The processor further performs the operation to determine a clock period for measuring power required for the design logic circuit and estimate, at the aligned clock edge, the power required for the design logic circuit corresponding to the determined clock period, which corresponds to a clock selected from the plurality of clocks and the master clock.

20 Claims, 11 Drawing Sheets

SYSTEM AND METHOD FOR POWER ANALYSIS FOR DESIGN LOGIC CIRCUIT WITH IRREGULAR CLOCK

CROSS-REFERENCE TO RELATED APPLICATIONS

The present application claims the benefit of Indian Patent Application No. 201911019698, filed on May 19, 2019, which is incorporated herein by reference in its entirety for all purposes.

TECHNICAL FIELD

The present disclosure is generally related to an emulation system. In particular, the present disclosure is related to a system and method for providing power analysis for a design logic circuit with irregular clocks.

BACKGROUND

A design logic circuit includes many clocks of different frequencies and phases. An emulation system evaluates the design logic circuit once per clock event in the design. Because many clocks differ in frequency and phase, the number of clocking events can be large, for example, when a number of clocks in the design logic circuit are asynchronous clocks. This degrades the overall performance of the emulation system.

Currently, available tools for power analysis require a definition of a regular clock. A clock is a regular clock if a time duration of the clock at a relatively low-level voltage (e.g., around ground) is constant over multiple cycles, and the time duration of the clock at a relatively high-level voltage (e.g., around supply voltage) is also constant over multiple cycles. The time duration of the clock at the relatively low-level voltage and that at the relatively high-level voltage may be different if the duty cycle of the clock is not 50%. A clock is an irregular clock if the time duration of the clock at a relatively low voltage level or relatively high voltage level varies over multiple cycles. In an emulation system, this can be implemented using a different number of emulation ticks for the relatively low voltage portions and relatively high voltage portions of the irregular clock. An emulation tick represents an emulation clock cycle. Accordingly, emulation clock cycles required for emulation of the design logic circuit may be expressed as a number of emulation ticks. The emulation system may use one or more irregular clocks. Accordingly, power analysis for the design logic using one or more irregular clocks either results in under-sampling or over-sampling of the power values. Some regular clock-period sections of the waveform may have zero or fewer clock edges than actual, while some sections may have more clock edges than actual clock edges. This leads to either false dips when there are fewer clock edges than the actual clock edges or false peaks when there are more than actual clock edges In addition, the clock frequency may change during the waveform or clock in the design logic circuit may be gated. The currently available tools do not provide an accurate power analysis for the design logic circuit with irregular clocks, which may lead to failure of the design logic circuit in the field.

SUMMARY

In one embodiment, a system for power analysis of a design logic is disclosed. The system includes a memory and a processor configured to perform operations stored in the memory. The processor executes the operations to select a master clock for a plurality of clocks in a design logic circuit and align a clock edge of a clock of the plurality of clocks with a corresponding nearest clock transition of the master clock. The aligned clock edge of the clock limits a number of emulation cycles for the design logic to a fixed number of emulation cycles required for the master clock. The processor executes the operation to determine a clock period for measuring power required for the design logic circuit and estimate, at the aligned clock edge, the power required for the design logic circuit corresponding to the determined clock period. The determined clock period corresponds to a clock selected from the plurality of clocks and the master clock. The clock of the plurality of clocks can be one of an emulated regular clock and an emulated irregular clock. A clock frequency of the master clock is higher than a clock frequency of each of the plurality of clocks. The master clock is one of a clock that is least-gated in the design logic circuit and a clock other than the plurality of clocks.

The clock of the plurality of clocks can be an emulated irregular clock. For estimating the power required for the design logic circuit, the processor can execute the operations to determine the clock period of the clock of the plurality of clocks by averaging a high-level period and a low-level period for a preconfigured number of clock cycles and measure power required for each logic of the design logic circuit associated with one or more clocks of the plurality of clocks at the determined clock period of the clock.

For estimating the power required for the design logic circuit, the processor can execute the operations to determine a clock cycle of the master clock for which a rising edge of the master clock does not correspond to a level change for any clock of the plurality of clocks, and filter out the clock cycle of the master clock from power calculation. The processor can execute the operations to estimate, at each rising edge of the remaining clock cycles of the master clock, power required for each logic of the design logic circuit associated with one or more clocks of the plurality of clocks.

The processor also executes the operations to emulate a predicted clock for a gated-clock of the plurality of clocks using a clock period that is determined based on a historical clock cycle pattern of the gated-clock. The processor can also execute the operations to measure an average clock period of a clock of the plurality of clocks based on a high-level period and a low-level period of all clock cycles of the clock and detect a change in a frequency of the clock in response to a change in the average clock period above a preconfigured threshold level.

In a second embodiment, a method for power analysis of a design logic is disclosed. The method includes selecting a master clock for a plurality of clocks in a design logic circuit and aligning a clock edge of a clock of the plurality of clocks with a corresponding nearest clock transition of the master clock. The aligned clock edge of the clock limits a number of emulation cycles for the design logic to a fixed number of emulation cycles required for the master clock. The method includes determining a clock period for measuring power required for the design logic circuit and estimating, at the aligned clock, the power required for the design logic circuit corresponding to the determined clock period. The determined clock period corresponds to a clock selected from the plurality of clocks and the master clock. The clock of the plurality of clocks can be one of an emulated regular clock and an emulated irregular clock. A clock frequency of the master clock is higher than a clock frequency of each of the plurality of clocks. The master clock is one of a clock that is least-gated in the design logic circuit and a clock other than the plurality of clocks.

The clock of the plurality of clocks can be an emulated irregular clock. For estimating the power required for the design logic circuit, the method also includes determining the clock period of the clock of the plurality of clocks by averaging a high-level period and a low-level period for a preconfigured number of clock cycles and measuring power required for each logic of the design logic circuit associated with one or more clocks of the plurality of clocks at the determined clock period of the clock.

For estimating the power required for the design logic circuit, the method also includes determining a clock cycle of the master clock for which a rising edge of the master clock does not correspond to a level change for any clock of the plurality of clocks, and filtering out the clock cycle of the master clock from power calculation. The method includes estimating, at each rising edge of the remaining clock cycles of the master clock, power required for each logic of the design logic circuit associated with one or more clocks of the plurality of clocks. The method also includes emulating a predicted clock for a gated-clock of the plurality of clocks using a clock period that is determined based on a historical clock cycle pattern of the gated-clock.

In a third embodiment, a non-transitory, tangible computer-readable media (CRM) is disclosed. The CRM includes instructions stored thereon that, when executed by at least computing device, causes the at least one computing device to perform operations including selecting a master clock for a plurality of clocks in a design logic circuit and aligning a clock edge of a clock of the plurality of clocks with a c corresponding nearest clock transition of the master clock. The at least one computing device performs operations including determining a clock period for measuring power required for the design logic circuit and estimating, at the aligned clock edge, the power required for the design logic circuit corresponding to the determined clock period.

DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Embodiments of the present disclosure describe a system and method for providing power analysis for a design logic circuit with an irregular clock.

Figure 1:
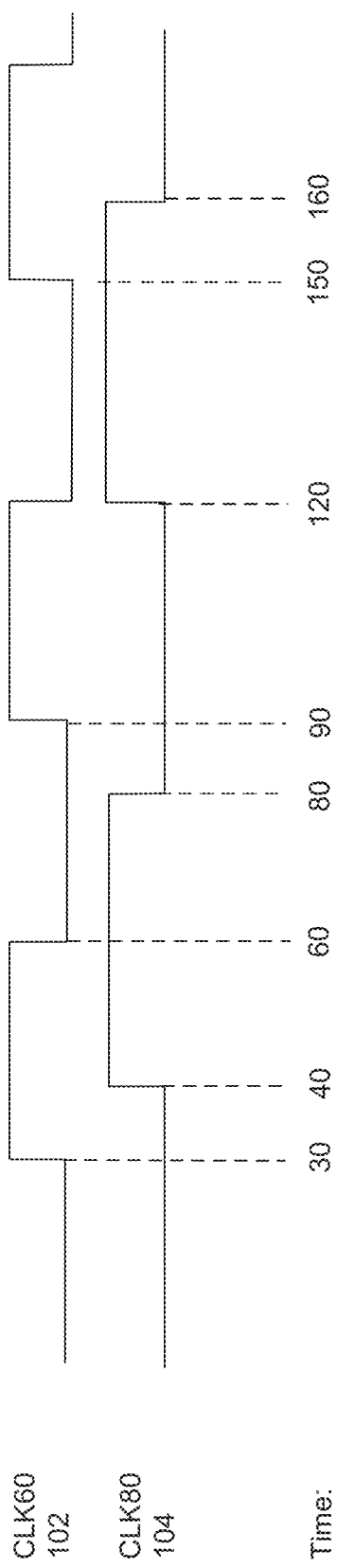
FIG. 1 illustrates simulation waveforms with two clocks.

Most design logic circuits contain multiple asynchronous clocks that may be modeled in simulation or emulation. Two clocks are asynchronous when the two clocks do not depend on each other. Thus, two separate clocks having the same frequency may be considered asynchronous clocks because they do not depend on each other. For example, the two asynchronous clocks of the same frequency may have a phase difference between them. FIG. 1 illustrates simulation waveforms with two clocks. Two asynchronous clocks CLK60 102 and CLK80 104 are shown, which may be modeled as ideal clocks. Each of the two asynchronous clocks CLK60 102 and CLK80 104 may have a unique asynchronous period, which corresponds with its clock frequency. As shown in FIG. 1, the asynchronous periods of the clock CLK60 102 and the clock CLK80 104 are 60 nanoseconds (ns) and 80 ns, respectively.

Figure 2:
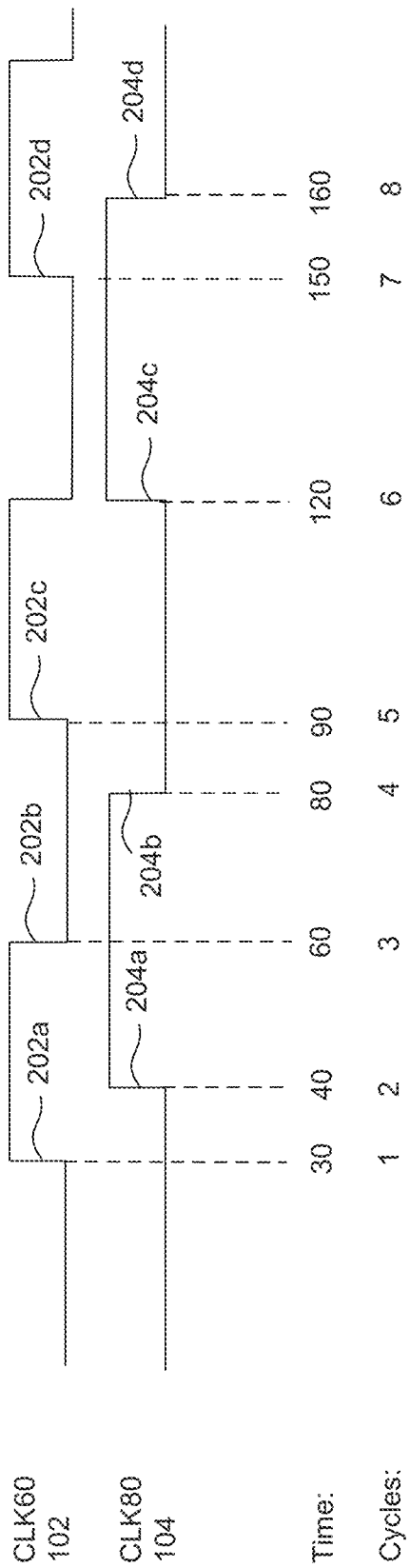
FIG. 2 illustrates emulation waveforms with two clocks.

In an emulation system, the design logic circuit is evaluated on each clock edge. Each evaluation requires one emulation event cycle. FIG. 2 illustrates emulation waveforms with two clocks. Waveforms of the two asynchronous clocks CLK60 102 and CLK80 104 are shown with a count of required emulation events. As shown in FIG. 2, each edge of the CLK60 102 marked by 202*a*, 202*b*, 202*c*, and 202*d*, and/or each edge of the CLK80 104 marked by 204*a*, 204*b*, 204*c*, and 204*d*, may consume one emulation event. Each emulation event corresponds with an emulation cycle. Accordingly, for two cycles of the asynchronous clocks, CLK60 102 and CLK80 104, eight emulation events, and, therefore, eight emulation cycles, may be required. Thus, compared to two synchronous clocks, which require only four emulation cycles, two asynchronous clocks require double the emulation cycles. Emulation of the two asynchronous clocks results in a double slowdown of the emulation process. Adding each asynchronous clock may further add to the slowdown and degrade emulation performance. This is more evident in a system-on-chip (SOC) design, which includes many asynchronous clocks.

In some embodiments, when there is a plurality of asynchronous clocks in the design logic circuit, one clock of the plurality of asynchronous clocks is identified as a master clock. If a clock included in the design logic circuit is not suitable to be the master clock, an additional clock not included in the design logic circuit may be selected as the master clock. The master clock may be the fastest clock among the plurality of asynchronous clocks. Clock edges of the remaining clocks of the plurality of asynchronous clocks are adjusted so that the clock edges of the remaining clocks are aligned with one or more clock edges of the master clock.

Figure 3:
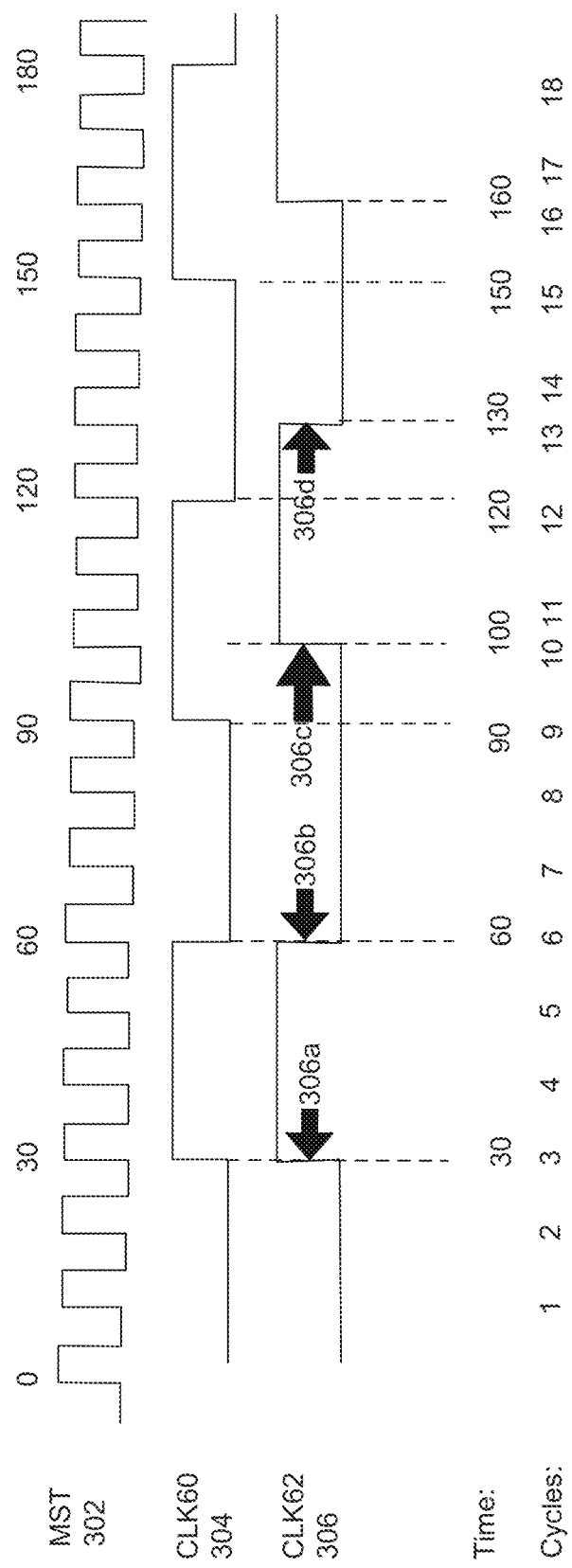
FIG. 3 illustrates emulation waveforms of design logic circuit that includes irregular emulation clocks, according to an exemplary embodiment of the present disclosure.

FIG. 3 illustrates emulation waveforms of design logic circuit that includes irregular emulation clocks, according to an exemplary embodiment of the present disclosure. The total number of emulation cycles required for emulation of the design logic circuit may correspond with the emulation cycles required for the master clock. In FIG. 3, three asynchronous clocks MST 302, CLK60 304, and CLK62 306 are shown having an asynchronous period of 10 ns, 60 ns, and 62 ns, respectively. Because MST 302 is the fastest clock among the three asynchronous clocks, MST 302 may be selected as the master clock of the design logic circuit. The clock CLK60 304 is a regular clock because each cycle of the clock CLK60 304 has a relatively high voltage value for 30 ns and a relatively low voltage value for 30 ns. However, the clock CLK62 306 does not have a rising edge at every 62 ns, but over the long-term, a period between two rising edges may be averaged to 62 ns. Therefore, the clock CLK62 306 is an irregular clock.

As described above, one or more clock edges of the CLK60 304 and CLK62 306 are moved either forward or backward, as shown in FIG. 3, so that all clock edges of the clocks CLK60 304 and CLK62 306 align with the clock edges of the master clock MST 302. In FIG. 3, black arrows marked 306a, 306b, 306c, and 306d, show moving one or more clock edges of the clocks CLK60 304 and CLK62 306 to align with a clock edge of the clock edges of the master clock MST 302 that is nearest. Accordingly, when additional asynchronous clocks are added, required emulation cycles for the design logic circuit do not change, because one emulation event or emulation cycle is required for every 10 ns period of the master clock MST 302.

Figure 4:
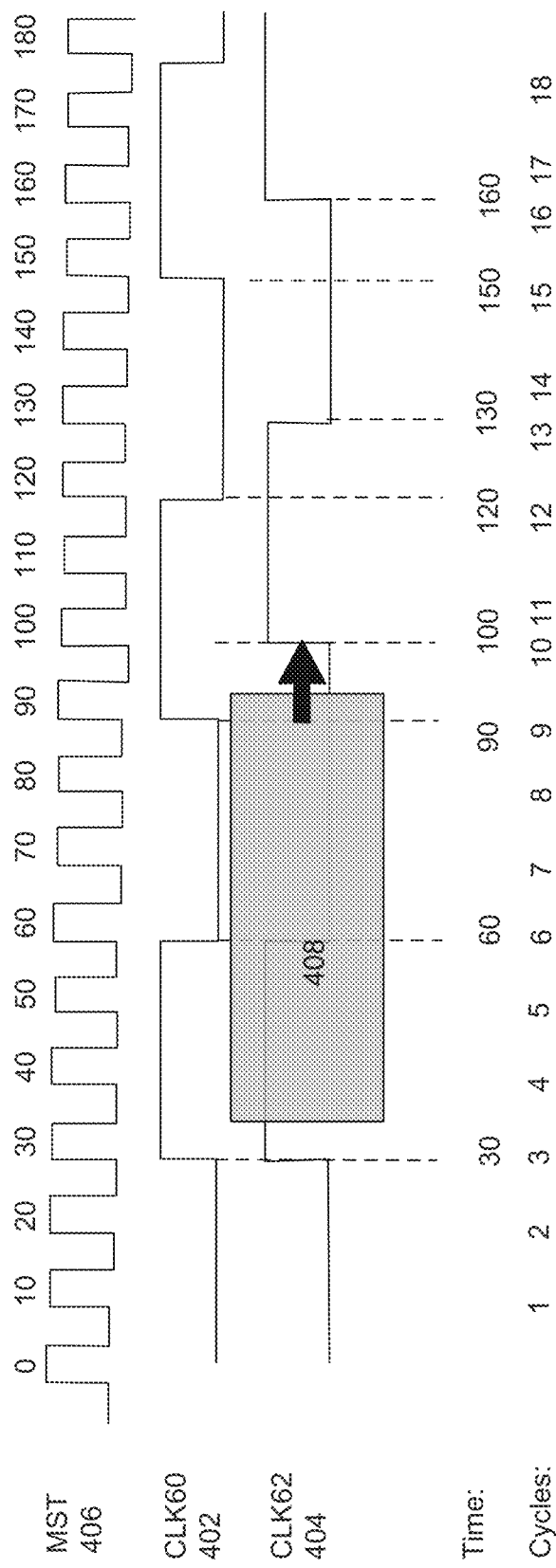
FIG. 4 illustrates power evaluation with irregular clocks, according to an exemplary embodiment of the present disclosure.
Figure 5:
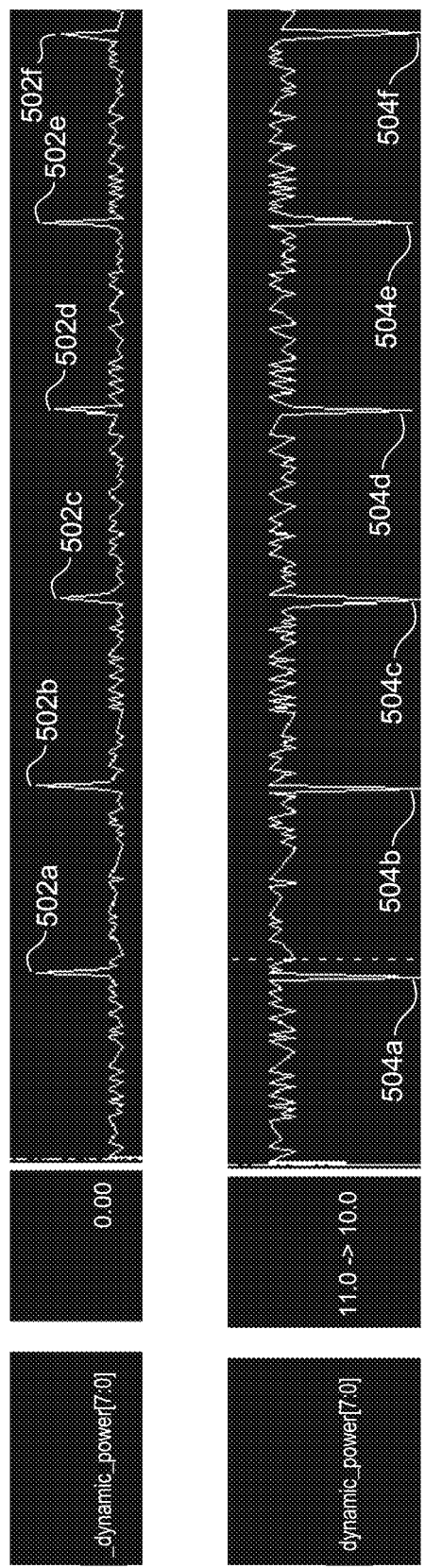
FIG. 5 illustrates a power graph of power evaluation with irregular clocks, according to an exemplary embodiment of the present disclosure.

Zero-delay event-based power estimation may be calculated every x-nanosecond that corresponds with a clock period of an ideal clock or a regular clock. Required power may be computed based on the power required for all events occurring in the evaluation period, and summing the computed power for each gate in the design logic circuit. However, estimating power this way provides an accurate measurement when all the clocks of the design logic circuit are regular clocks. FIG. 4 illustrates power evaluation with irregular clocks, according to an exemplary embodiment of the present disclosure. For an evaluation period of 60 ns for the regular clock CLK60 402, power may be required for any logic associated with the regular clock CLK60 402 as a rising edge occurs at a time marked by 90. However, because the irregular clock CLK62 404 has no rising edge at the time marked by 90 but instead delayed until time marked by 100, the power for all logic associated with the clock CLK62 404 may be incorrect as having false-dips, as shown in FIG. 4 by 408. Similar to false-dips, false-peaks may also occur. FIG. 5 illustrates a power graph of power evaluation with irregular clocks, according to an exemplary embodiment of the present disclosure. A power graph 500 in FIG. 5 shows the false-dips 504a-f, and false-picks 502a-f, due to measuring power at every 60 ns period of the regular clock CLK60 402.

In accordance with some embodiments, the problem of false-dips may be avoided by measuring power based on an irregular clock CLK62 404. Power may be measured at each rising edge of the irregular clock. The irregular clock CLK62 404 has either an actual or a delayed rising edge at various times (e.g., marked by 30, 100, and 160). Therefore, power may be calculated at either 60 ns or 70 ns apart. If a stimulus is uniform or constant, the calculated power may be expressed as either energy/60 or energy/70. In other words, the calculated power may have a ripple, which is an improvement over false-dips, as shown in the power graph 500. To remove such a ripple effect, the power values may be calculated using the average period of the irregular clock, energy/62 ns in this example. Further, no additional emulation event is required for measuring power based on any number of irregular clocks.

In some embodiments, the required power may be calculated using a master clock. In FIG. 4, a master clock MST 406 is shown, which has a clock period of 10 ns. Accordingly, power may be calculated at each rising edge of the master clock. However, for various time points where the power calculated may have zero dynamic energy. For example, at time points marked in FIG. 4 as 40, 50, 70, and 80, logics associated with the clock CLK60 402. The clock CLK62 404 may have zero dynamic energy because the regular clock CLK60 402 and the irregular clock CLK62 404 have either a relatively high voltage level or a relatively low voltage level, but no voltage level change event is occurring during these time points marked 40, 50, 70, and 80. Power measured during such time points, e.g., 40, 50, 70, and 80, may be filtered out from calculation. At other time points, where there is a rising edge, logic associated with the clock CLK60 402 and the clock CLK62 404 may have dynamic energy due to an associated voltage level change event. The calculated non-zero dynamic energy may then be divided by a clock period of the irregular clock CLK62 404, which is 62 ns in this case. Accordingly, the calculated required power may be accurate. Further, no additional emulation event may be required for measuring power based on any number of irregular clocks.

In some embodiments, a predicted clock may be generated. The predicted clock may represent a waveform without clock-gating. The predicted clock may be snapped forward or backward to match the sampled clock or a predicted sample point. This may be needed for designs with more than one clock, and where logic occurs between two separate time domains.

The clock signals in the design logic circuit are often gated in various regions of the design. The predicted clock may be calculated using a primary clock, which is the least-gated clock. The primary clock may be the closest to the clock generator circuit and may have a user-specified period for power estimation.

During power analysis, the waveform for the entire test may be available, which may be used to calculate a waveform of the predicted clock using the past and future of the available waveform of the entire test. Accordingly, if a clock is gated, missing edges due to clock gating may be predicted for when the edges may have occurred if clock gating is not present. The predicted clock may be used to determine when to perform the power calculation. By way of a non-limiting example, power may be calculated on every predicted edge. As described above, the clock edges of the predicted clock may be aligned with the sampled clock, or in places where a gated-clock edge may have occurred. Accordingly, power calculation may be performed at times that may be shifted forward or backward compared to the ideal clock.

Because the time period used for measurement is the period since the last evaluation, it ensures that the ripple described above does not occur. For a fixed frequency clock or a regular clock, the time period is constant and does not change during the test. However, for the irregular clock of a clock period of 62 ns used in this disclosure, power calculation may be performed at 62 ns even though the actual design clock may have a clock cycle of 60 ns or 65 ns depending on where in the waveform the calculation occurs.

The resultant power waveform may have values present at every predicted clock edge of all design clocks and any predicted time when the clock is gated. The power values may shift from the 62 ns period of the ideal clock. However, the calculated power values may be correct without any second-order ripple present in the values.

Figure 6:
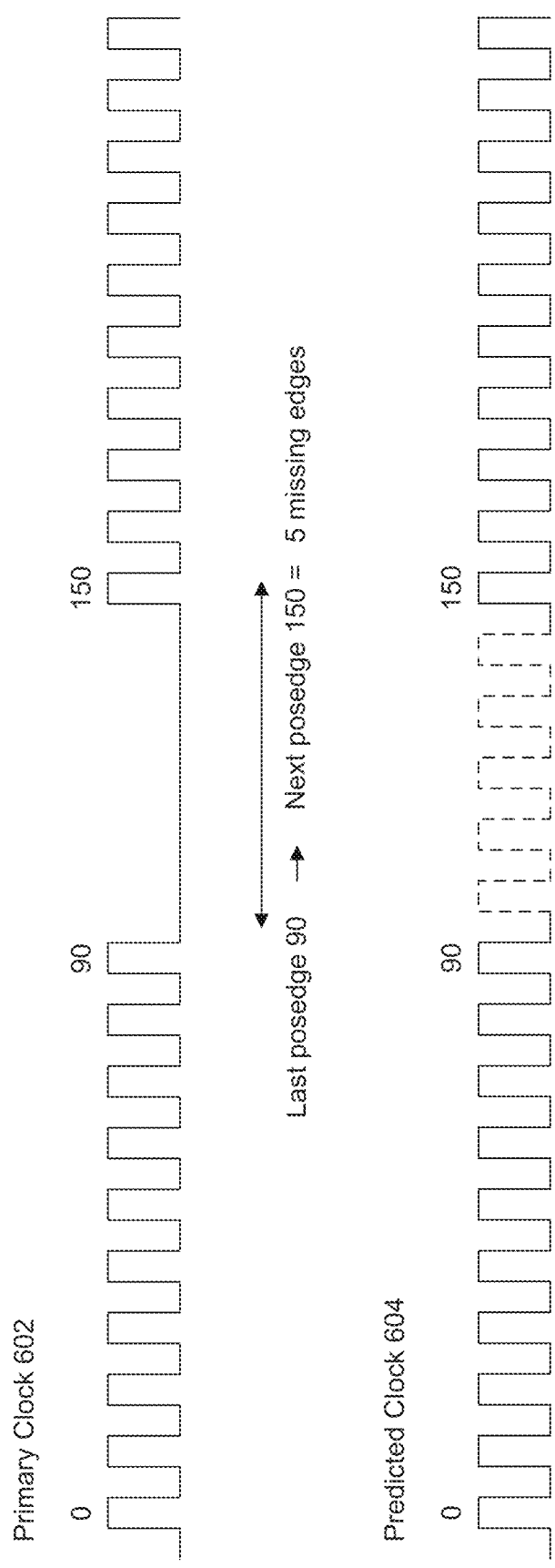
FIG. 6 illustrates clock waveforms predicted for a gated clock, according to an exemplary embodiment of the present disclosure.

A relatively high voltage time period (referred to as a high-level time period herein) and a relatively low voltage time period (referred to as a low-level time period herein) of the primary clock may be calculated by averaging the low time or high time for a configurable predetermined number of cycles specified by a user, by way of a non-limiting example, 10 cycles. The calculated average becomes a fixed number as the number of cycles in the calculation increases. An approximate value for the primary clock is sufficient as the actual edges are used if they occur. FIG. 6 illustrates clock waveforms predicted for a gated clock, according to an exemplary embodiment of the present disclosure. A primary clock 602 and a predicted clock 604 are shown. As described above, by averaging the low and high period over 10 cycles, a clock period may be determined as 10 ns. Because no rising edge has been detected between times marked by 90 and 150, it may be predicted that five clock cycles are missing. Accordingly, the predicted clock 604 may be generated with five added cycles.

Figure 7:
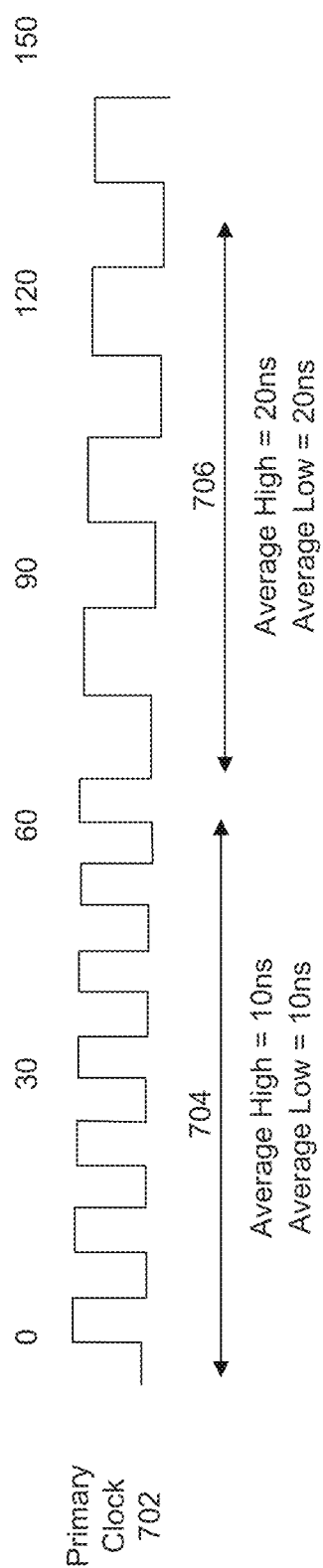
FIG. 7 illustrates a primary clock with frequency change, according to an exemplary embodiment of the present disclosure.

FIG. 7 illustrates a primary clock with frequency change, according to an exemplary embodiment of the present disclosure. A change in frequency of a primary clock may be detected by continuously calculating the low-level time period and the high-level time period. A primary clock 702 has a first set of clock cycles 704 for which the clock period may be determined as 20 ns because of 10 ns of the high-level time period and 10 ns of the low-level time period. The primary clock 702 has a second set of clock cycles 706 for which the clock period may be determined as 40 ns based on the high-level time period and the low-level time period of 20 ns each. If the period changes by a preconfigured user-specified threshold, for example, 5 percent, then the frequency may be determined as changed. Accordingly, for the primary clock 702, detected change in the clock period is 100 percent that exceeds the preconfigured user-specified threshold of 5 percent. Therefore, it may be concluded that the frequency of the primary clock 702 has changed.

Figure 8:
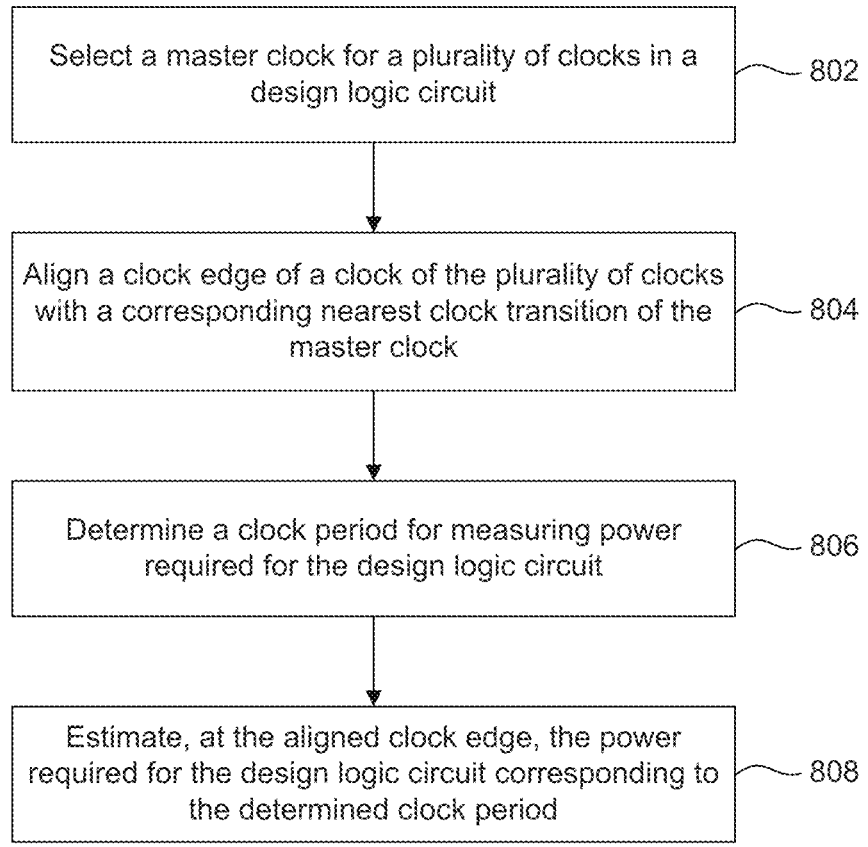
FIG. 8 illustrates a flowchart of a method for power analysis of a design logic circuit with an irregular clock, according to an exemplary embodiment of the present disclosure.

FIG. 8 illustrates a flowchart of a method for power analysis of a design logic circuit with irregular clocks, according to an exemplary embodiment of the present disclosure. At 802, a master clock is selected for a plurality of clocks in a design logic circuit. As described in the above sections, a clock of the plurality of clocks may be a regular clock or an irregular clock. The master clock may be a regular clock that is least-gated in the design logic circuit compared to any other clock of the plurality of clocks.

At 804, a clock edge of a clock of the plurality of clocks may be aligned with a corresponding nearest clock transition of the master clock. The aligning of the clock edge of the clock limits a number of emulation cycles for the design logic to a fixed number of emulation cycles required for the master clock. Accordingly, the emulation events and/or emulation cycles for the design logic circuit may not depend on the number of clocks in the design logic circuit. The number of emulation cycles may thus correspond with the number of cycles of the master clock.

At 806, a clock period for measuring power required for the design logic circuit may be determined. The clock period may correspond to a clock selected from the plurality of clocks and the master clock. Because the master clock is a regular clock, the clock period for the master clock may be determined based on consecutive rising edges of the master clock. The clock period of a clock of the plurality of clocks may be determined by averaging a predetermined number of cycles, including a high voltage level period and a low voltage level period. The predetermined number of cycles may be configurable and/or user-specified.

At 808, the power required for the design logic circuit may be estimated at the aligned clock edge corresponding to the clock period determined at 806. As described herein, the power required may be computed for each logic associated with one or more clocks of the plurality of clocks in the design logic circuit. Because the number of emulation events is fixed to a known number and does not depend on a number of clocks in the design logic circuit. By way of a non-limiting example, the estimated power at the aligned clock edge may be divided over the clock period determined by averaging a predetermined number of cycles, including a high voltage level period and a low voltage level period. Accordingly, the required power may be calculated without false-peaks and/or false-dips.

Figure 9:
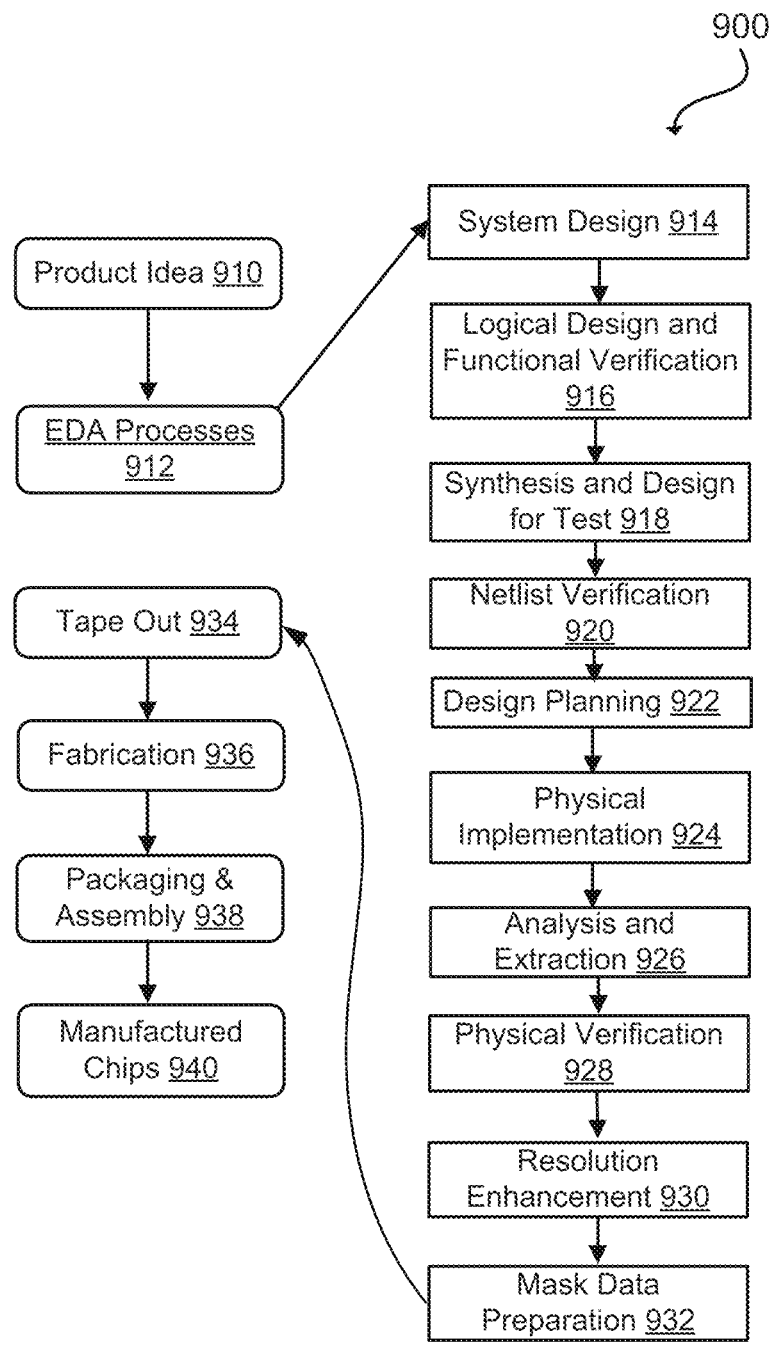
FIG. 9 illustrates a flowchart of various processes used during the design and fabrication of an integrated circuit, according to an exemplary embodiment of the present disclosure.

FIG. 9 illustrates an example set of processes 900 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 910 with information supplied by a designer, information that is transformed to create an article of manufacture that uses a set of EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936, and packaging and assembly processes 938 are performed to produce the finished integrated circuit 940.

Specifications for a circuit or electronic structure may range from low-level transistor material layouts to high-level description languages. A high-level of abstraction may be used to design circuits and systems, using a hardware description language (HDL) such as VHDL, Verilog, SystemVerilog, SystemC, MyHDL, or OpenVera. The HDL description can be transformed to a logic-level register transfer level (RTL) description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying descriptions that are more detailed is SPICE, which is used for detailed descriptions of circuits with many analog components. Descriptions at each level of abstraction are enabled for use by the corresponding tools of that layer (e.g., a formal verification tool). A design process may use a sequence depicted in FIG. 9. The processes described by being enabled by EDA products (or tools).

During system design 914, the functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During the logic design and functional verification 916, modules or components in the circuit are specified in one or more description languages, and the specification is checked for functional accuracy. For example, the components of the circuit may be verified to generate outputs that match the requirements of the specification of the circuit or system being designed. Functional verification may use simulators and other programs such as test bench generators, static HDL checkers, and formal verifiers. In some embodiments, special systems of components referred to as 'emulators' or 'prototyping systems' are used to speed up the functional verification.

During synthesis and design for test 918, HDL code is transformed into a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flip-flop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for the production of lithography masks. During mask data preparation 932, the 'tape-out' data is used to produce lithography masks that are used to produce finished integrated circuits.

A storage subsystem of a computer system (such as computer system 1100 of FIG. 11, or host system 1007 of FIG. 10) may be used to store the programs and data structures that are used by some or all of the EDA products described herein, and products used for the development of cells for the library and for the physical and logical design that use the library.

Figure 10:
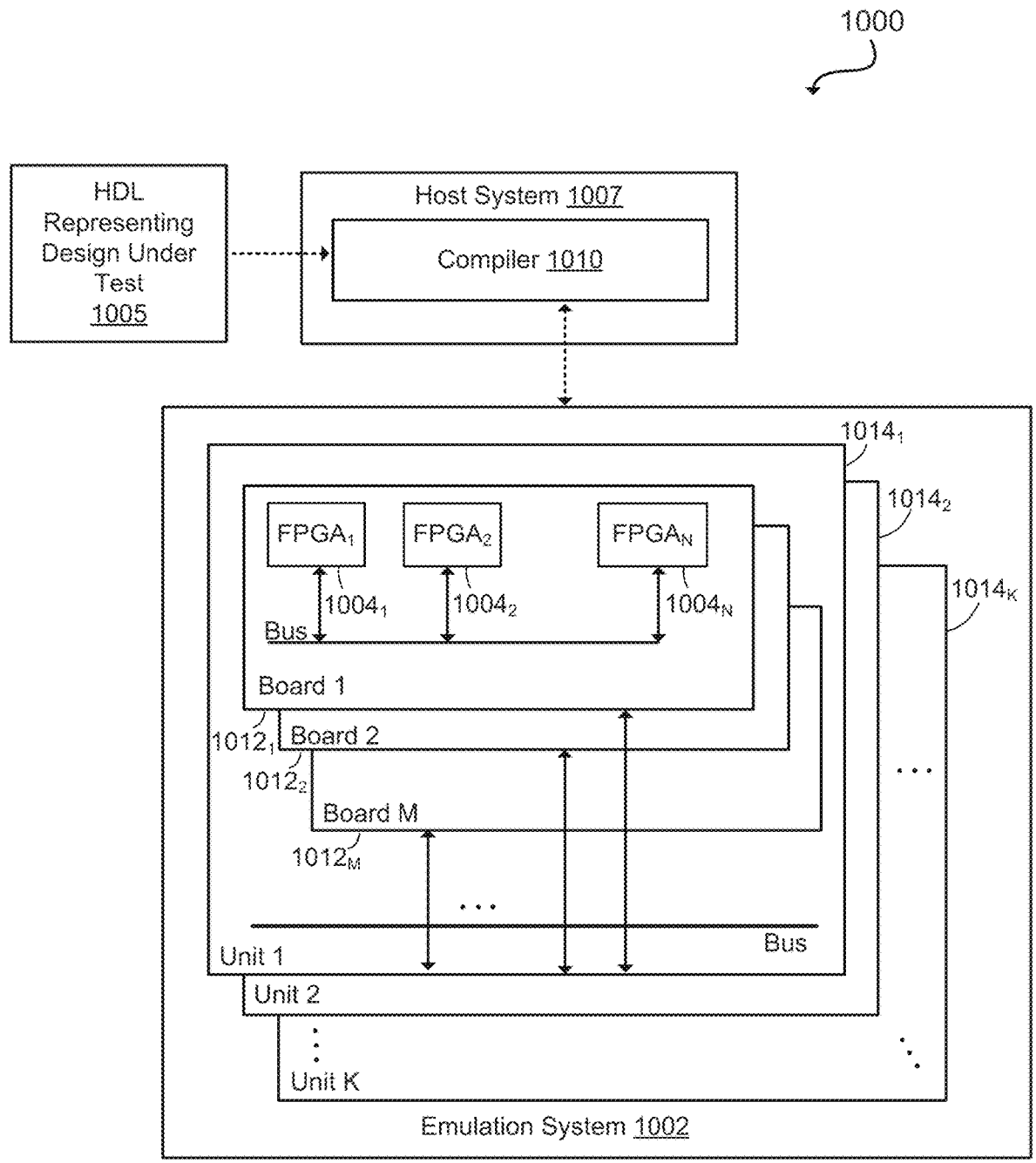
FIG. 10 illustrates a diagram of an emulation system, according to an exemplary embodiment of the present disclosure.

FIG. 10 depicts an abstract diagram of an example emulation environment 1000. An emulation environment 1000 may be configured to verify the functionality of the circuit design. The emulation environment 1000 may include a host system 1007 (e.g., a computer that is part of an EDA system) and an emulation system 1002 (e.g., a set of programmable devices such as Field Programmable Gate Arrays (FPGAs) or processors). The host system generates data and information by using a compiler 1010 to structure the emulation system to emulate a circuit design. Circuit design to be emulated is also referred to as a Design Under Test (DUT) where data and information from the emulation are used to verify the functionality of the DUT.

The host system 1007 may include one or more processors. In the embodiment where the host system includes multiple processors, the functions described herein as being performed by the host system can be distributed among the multiple processors. The host system 1007 may include a compiler 1010 to transform specifications written in a description language that represents a DUT and to produce data (e.g., binary data) and information that is used to structure the emulation system 1002 to emulate the DUT. The compiler 1010 can transform, change, restructure, add new functions to, and/or control the timing of the DUT.

The host system 1007 and emulation system 1002 exchange data and information using signals carried by an emulation connection. The connection can be but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 1007 and emulation system 1002 can exchange data and information through a third device such as a network server.

The emulation system 1002 includes multiple FPGAs (or other modules) such as FPGAs 10041 and 10042, as well as additional FPGAs to 1004N. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 1002 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs 10041-1004N may be placed onto one or more boards 10121 and 10122 as well as additional boards through 1012*m*. Multiple boards can be placed into an emulation unit 10141. The boards within an emulation unit can be connected using the backplane of the emulation unit or any other types of connections. In addition, multiple emulation units (e.g., 10141 and 10142 through 1014K) can be connected to each other by cables or any other means to form a multi-emulation unit system.

For a DUT that is to be emulated, the host system 1007 transmits one or more bit files to the emulation system 1002. The bit files may specify a description of the DUT and may further specify partitions of the DUT created by the host system 1007 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 1007 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate-level netlist using the DUT description. A host system can use the netlist of the DUT to partition the DUT into multiple partitions, where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT, which includes interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In the case of multiple re-emulations of an FPGA, merging the results produces a full debug view.

The host system receives, from the emulation system, signals traced by the logic of the identified FPGAs during the re-emulation of the component. The host system stores the signals received from the emulator. The signals traced during the re-emulation can have a higher sampling rate than the sampling rate during the initial emulation. For example, in the initial emulation, a traced signal can include a saved state of the component every X milliseconds. However, in the re-emulation, the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterward, the circuit designer can request to re-emulate the same component for a different time period or to re-emulate another component.

A host system 1007 and/or the compiler 1010 may include subsystems such as, but not limited to, a design synthesizer sub-system, a mapping sub-system, a run time sub-system, a results sub-system, a debug sub-system, a waveform sub-system, and a storage sub-system. The sub-systems can be structured and enabled as an individual or multiple modules, or two or more may be structured as a module. Together these sub-systems structure the emulator and monitor the emulation results.

The design synthesizer sub-system transforms the HDL that is representing a DUT 1005 into gate-level logic. For a DUT that is to be emulated, the design synthesizer sub-system receives a description of the DUT. If the description of the DUT is fully or partially in HDL (e.g., RTL or another level of abstraction), the design synthesizer sub-system synthesizes the HDL of the DUT to create a gate-level netlist with a description of the DUT in terms of gate-level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate-level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), a signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states, and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that is associated with the time period.

The debug sub-system transmits the retrieved interface signals to the emulator. The debug sub-system instructs the debug sub-system to use the identified FPGAs and for the trace and injection logic of each identified FPGA to inject its respective traced signals into the logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to use all the cycles collectively.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 11:
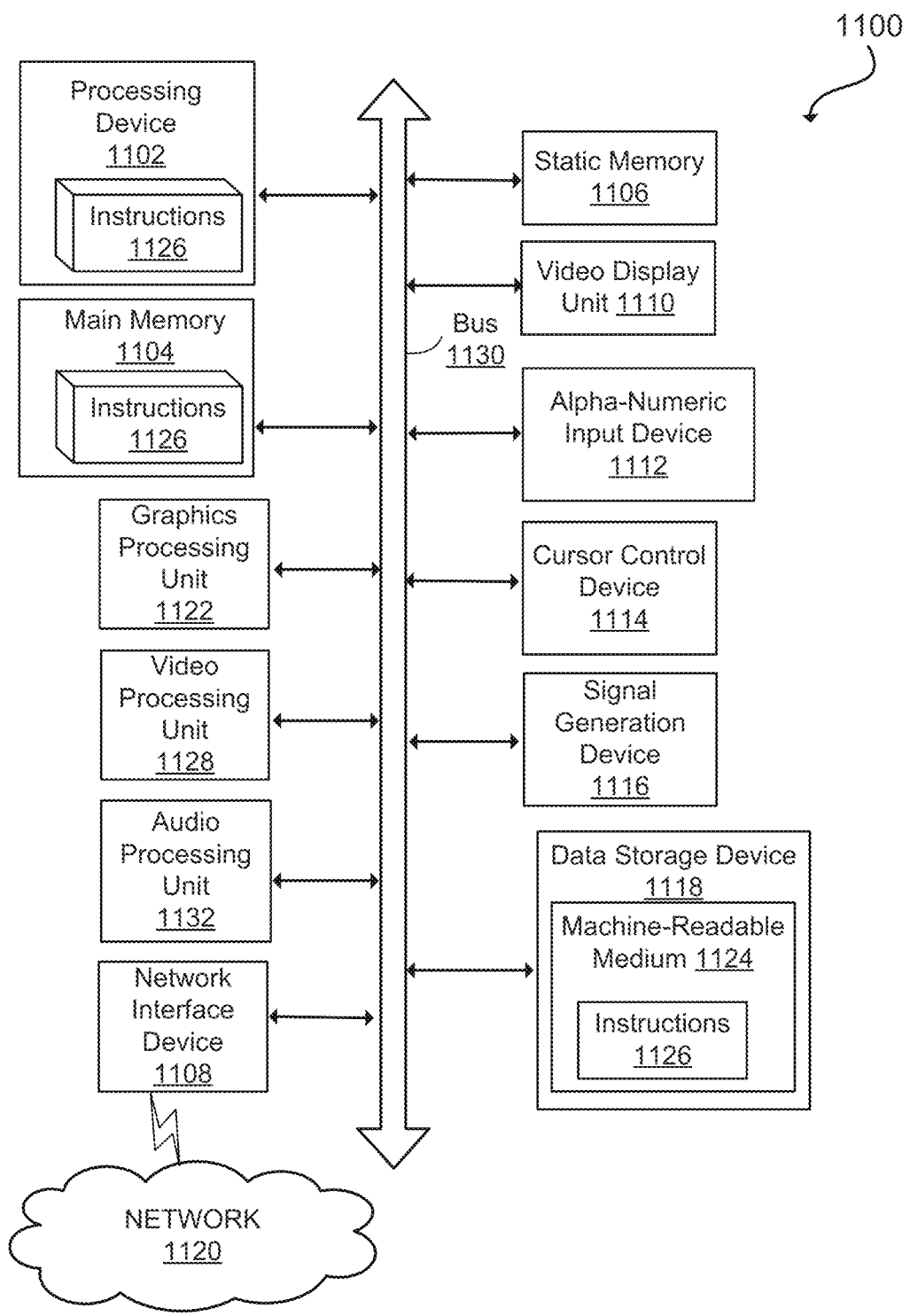
FIG. 11 illustrates a diagram of a computer system, according to an exemplary embodiment of the present.

FIG. 11 illustrates an example machine of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM), a static memory 1106 (e.g., flash memory, static random access memory (SRAM), etc.), and a data storage device 1118, which communicate with each other via a bus 1130.

The processing device 1102 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 1102 may also be one or more special-purpose processing devices such as an application-specific integrated circuit (ASIC), a field-programmable gate array (FPGA), a digital signal processor (DSP), network processor, or the like. The processing device 1102 may be configured to execute instructions 1126 for performing the operations and steps described herein.

The computer system 1100 may further include a network interface device 1108 to communicate over the network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a graphics processing unit 1122, a signal generation device 1116 (e.g., a speaker), graphics processing unit 1122, video processing unit 1128, and audio processing unit 1132.

The data storage device 1118 may include a machine-readable storage medium 1124 (also known as a non-transitory computer-readable medium) on which is stored one or more sets of instructions 1126 or software embodying any one or more of the methodologies or functions described herein. The instructions 1126 may also reside, completely or at least partially, within the main memory 1104 and/or within the processing device 1102 during execution thereof by the computer system 1100, the main memory 1104, and the processing device 1102 also constituting machine-readable storage media.

In some implementations, the instructions 1126 include instructions to implement functionality corresponding to the present disclosure. While the machine-readable storage medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1102 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work to others skilled in the art most effectively. An algorithm may be a sequence of operations leading to the desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure, as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the scope of implementations of the disclosure as set forth in the following claims. Where the disclosure refers to some elements in the singular tense, more than one element can be depicted in the figures, and like elements are labeled with like numerals. The disclosure and drawings are, accordingly, to be regarded in an illustrative sense rather than a restrictive sense.

What is claimed:

1. A system, comprising:
a memory; and
a processor configured to perform operations stored in the memory, wherein the processor executes the operations to:
select a master clock for a plurality of clocks in a design logic circuit, wherein the master clock is a least-gated clock in the design logic circuit;
align a clock edge of a clock of the plurality of clocks with a corresponding nearest clock transition of the master clock;
determine a clock period for measuring power required for the design logic circuit; and
estimate, at the aligned clock edge, the power required for the design logic circuit corresponding to the determined clock period.

2. The system of claim 1, wherein the aligned clock edge of the clock limits a number of emulation cycles for the design logic to a fixed number of emulation cycles required for the master clock.

3. The system of claim 1, wherein the clock period corresponds to a clock selected from the plurality of clocks and the master clock.

4. The system of claim 1, wherein the clock of the plurality of clocks is one of an emulated regular clock and an emulated irregular clock.

5. The system of claim 1, wherein a clock frequency of the master clock is higher than a clock frequency of each of the plurality of clocks.

6. The system of claim 1, wherein the clock of the plurality of clocks is an emulated irregular clock, and
the processor executes the operations to estimate the power required for the design logic circuit further comprises:
determine the clock period of the clock of the plurality of clocks by averaging a high-level period and a low-level period for a preconfigured number of clock cycles; and
measure power required for each logic of the design logic circuit associated with one or more clocks of the plurality of clocks at the determined clock period of the clock.

7. The system of claim 1, wherein the processor executes the operations to estimate the power required for the design logic circuit further comprises:
determine a clock cycle of the master clock for which a rising edge of the master clock does not correspond to a level change for any clock of the plurality of clocks;
filter out the clock cycle of the master clock from power calculation; and
estimate, at each rising edge of remaining clock cycles of the master clock, power required for each logic of the design logic circuit associated with one or more clocks of the plurality of clocks.

8. The system of claim 1, wherein the processor executes the operations to further emulate a predicted clock for a gated-clock of the plurality of clocks using a clock period that is determined based on a historical clock cycle pattern of the gated-clock.

9. The system of claim 1, wherein the processor executes the operations to further:
measure an average clock period of a clock of the plurality of clocks based on a high-level period and a low-level period of all clock cycles of the clock; and
detect a change in a frequency of the clock in response to a change in the average clock period above a preconfigured threshold level.

10. The system of claim 1, wherein the least-gated clock in the design logic circuit is closest to a clock generator circuit.

11. A method, comprising:
selecting a master clock for a plurality of clocks in a design logic circuit, wherein the master clock is a least-gated clock in the design logic circuit;
aligning a clock edge of a clock of the plurality of clocks with a corresponding nearest clock transition of the master clock;
determining a clock period for measuring power required for the design logic circuit; and
estimating, at the aligned clock edge, the power required for the design logic circuit corresponding to the determined clock period.

12. The method of claim 11, wherein the aligned clock edge of the clock limits a number of emulation cycles for the design logic to a fixed number of emulation cycles required for the master clock.

13. The method of claim 11, wherein the clock period corresponds to a clock selected from the plurality of clocks and the master clock.

14. The method of claim 11, wherein the clock of the plurality of clocks is one of an emulated regular clock and an emulated irregular clock.

15. The method of claim 11, wherein a clock frequency of the master clock is higher than a clock frequency of each of the plurality of clocks.

16. The method of claim 11, wherein the clock of the plurality of clocks is an emulated irregular clock, and
wherein for estimating the power required for the design logic circuit, the method further comprises:
determining the clock period of the clock of the plurality of clocks by averaging a high-level period and a low-level period for a preconfigured number of clock cycles; and
measuring power required for each logic of the design logic circuit associated with one or more clocks of the plurality of clocks at the determined clock period of the clock.

17. The method of claim 11, wherein for estimating the power required for the design logic circuit, the method further comprises:
determining a clock cycle of the master clock for which a rising edge of the master clock does not correspond to a level change for any clock of the plurality of clocks;
filtering out the clock cycle of the master clock from power calculation; and
estimating, at each rising edge of the remaining clock cycles of the master clock, power required for each logic of the design logic circuit associated with one or more clocks of the plurality of clocks.

18. The method of claim 11, further comprising emulating a predicted clock for a gated-clock of the plurality of clocks using a clock period that is determined based on a historical clock cycle pattern of the gated-clock.

19. The method of claim 11, wherein the least-gated clock in the design logic circuit is closest to a clock generator circuit.

20. A non-transitory, tangible computer-readable media having instructions stored thereon that, when executed by at least one computing device, cause the at least one computing device to perform operations comprising:
  selecting a master clock for a plurality of clocks in a design logic circuit, wherein the master clock is a least-gated clock in the design logic circuit;
  aligning a clock edge of a clock of the plurality of clocks with a corresponding nearest clock transition of the master clock;
  determining a clock period for measuring power required for the design logic circuit; and
  estimating, at the aligned clock edge, the power required for the design logic circuit corresponding to the determined clock period.

* * * * *